(12) United States Patent
Peck (10) Patent No.: US 10,961,053 B2
(45) Date of Patent: Mar. 30, 2021

(54) LIGHT ASSISTED PACK WALL CARTON SELECTION AND REPLENISHMENT SYSTEM

(71) Applicant: Fastfetch Corporation, Pendleton, SC (US)

(72) Inventor: John C. Peck, Seneca, SC (US)

(73) Assignee: Fastfetch Corporation, Pendleton, SC (US)

( * ) Notice: Subject to any disclaimer, the term of this patent is extended or adjusted under 35 U.S.C. 154(b) by 20 days.

(21) Appl. No.: 16/205,382

(22) Filed: Nov. 30, 2018

(65) Prior Publication Data

US 2019/0300284 A1 Oct. 3, 2019

Related U.S. Application Data

(63) Continuation-in-part of application No. 15/942,171, filed on Mar. 30, 2018, now Pat. No. 10,672,094.

(51) Int. Cl.

| | |
|---|---|
| *B65G 1/06* | (2006.01) |
| *G06Q 10/08* | (2012.01) |
| *G06Q 50/28* | (2012.01) |
| *B65B 5/02* | (2006.01) |
| *B65G 1/137* | (2006.01) |

(52) U.S. Cl.
CPC ............ *B65G 1/065* (2013.01); *B65B 5/02* (2013.01); *B65G 1/1373* (2013.01); *G06Q 10/08* (2013.01); *G06Q 50/28* (2013.01); *B65G 2209/04* (2013.01); *B65G 2209/06* (2013.01)

(58) Field of Classification Search
CPC combination set(s) only.
See application file for complete search history.

(56) References Cited

U.S. PATENT DOCUMENTS

| | | |
|---|---|---|
| 5,505,473 A | 4/1996 | Radcliffe |
| 5,877,962 A | 3/1999 | Radcliffe |
| 6,157,915 A | 12/2000 | Bhaskaran et al. |
| 6,615,104 B2 | 9/2003 | England et al. |
| 6,775,588 B1 | 8/2004 | Peck |
| 7,647,752 B2 | 1/2010 | Magnell |
| 8,019,463 B2 | 9/2011 | Peck |
| 8,301,294 B1 * | 10/2012 | Shakes ............ B07C 5/38 209/583 |

(Continued)

*Primary Examiner* — Kyle O Logan
(74) *Attorney, Agent, or Firm* — Kim and Lahey Law Firm LLC; Douglas W. Kim (57) ABSTRACT

A pack wall carton selection and replenishment system comprising: a delivery cart with a delivery cart controller configured to receive information representing a replenishment shipping carton to be retrieved from a shipping carton supply area and delivered to a pack wall, provide for retrieving one or more shipping cartons from the shipping carton supply area, actuate a cart indicator assembly to identify a cart partition where to place the retrieved shipping cartons on the delivery cart, actuate a delivery cart indicator assembly to identify the replenishment shipping carton to be placed on the pack wall; and, a pack wall controller in communication with the delivery cart controller configured to receive an order item information, actuate a first pack wall indicator assembly to indicate a desired shipping carton to be used for packing an items represented by the order item information.

20 Claims, 6 Drawing Sheets

(56) References Cited

U.S. PATENT DOCUMENTS

| | | | |
|---|---|---|---|
| 9,248,965 B1* | 2/2016 | Kritchevsky | B65G 1/1371 |
| 9,914,278 B2 | 3/2018 | Pettersson et al. | |
| 2007/0050080 A1* | 3/2007 | Peck | B65G 1/137 700/214 |
| 2016/0176562 A1 | 6/2016 | Pettersson et al. | |
| 2017/0015502 A1* | 1/2017 | Engel | B65G 1/0492 |
| 2017/0036798 A1* | 2/2017 | Prahlad | G06Q 50/28 |

* cited by examiner

LIGHT ASSISTED PACK WALL CARTON SELECTION AND REPLENISHMENT SYSTEM

PRIORITY CLAIM

This application claims priority to U.S. patent application Ser. No. 15/942,171 filed Mar. 30, 2018, which claims priority on U.S. Patent Application 62/480,504 filed Apr. 2, 2017, both of which are incorporated by reference.

BACKGROUND

1) Field of the Invention

The invention is directed to an automated distributed system allowing for identification, selection, use and replenishment of a large number of shipping cartons without having to use a large inventory of premade (flat, not erected) shipping cartons.

2) Description of Related Art

Modern business relies upon an efficient flow of parts from inventory from manufacturers, storage facilities, or other locations to up-stream manufacturers, wholesalers, retailers, or end users. One such flow of parts is a supply chain which is a group of organizations, activities, and information that move goods from suppliers to customers. Supply chains are needed because goods do not typically pass directly from the manufacturer to the customer due to reasons that can include geographic, volume efficiencies, product characteristics, multiple manufacturers, assembly processes, and value-added activity in the supply chain. In a supply chain, many goods are transported from the respective manufacturer to a distribution center or warehouse where they are then stored and picked for subsequent distribution. One description of the operations of a supply chain is included in U.S. Pat. No. 6,157,915. In a supply chain, one or more of the participants receives and fills orders for goods (e.g. parts, SKUs, and/or components), picks items from the storage facility (e.g. warehouse), packs the picked items, and has the packed items transported to the ordering entity.

Supply chains are also present in the wholesale or retail delivery of goods to customers. Wholesale and retail supply chains differ from many other industries due to the high velocity movement of goods through the supply chain, the lower inventories of available goods and the increased transaction volumes due to customers placing smaller order more frequently. The advent of the internet has enabled retailers to provide convenient, online ordering to their customers. This new business model is often referred to as ecommerce. A consequence of ecommerce is that the costs of providing goods from distribution center to a consumer is substantially higher than providing a retailer with comparable items in bulk. When a consumer orders a relatively small number of items, it is advantageous to use cartons that, once filled with the ordered items, contains the least amount of "air" or "dead space" as the carton the cost of shipping is largely a function of the carton size and less a function of the carton weight. Given dimensional-weight pricing, the carton size used for a particular shipment can have a significant impact on how much that shipment will cost. There have been attempts to optimize the selection of a carton size such as U.S. Pat. No. 6,615,104. However, this attempt makes no mention of actually how to efficiently store many carton sizes and quickly provide them to an individual worker who packs items and places then in the carton. The problem of efficiently managing a sufficient number of carton sizes without having to place many cartons of each size near packing stations still exists. Placing an inventory of carton sizes near packing stations creates significant space problems and can overload the packing station with multiple cartons or multiple sizes. Furthermore, quickly locating and retrieving an optimal or preferred carton among a large number of carton sizes is a significant challenge.

When filling orders, steps typically include: locating the precise item in the storage facility, retrieving (or picking) the desired quantity of that item, and placing (or putting) the retrieved items in a designated shipping carton, or receptacle such as a tote. These basic steps are often termed picking or order fulfillment. Examples of computerized picking systems are shown in U.S. Pat. Nos. 6,775,588, and 8,019,463 incorporated by reference. U.S. Pat. Nos. 5,505,473 and 5,877,962 disclose a computer-based system to facilitate placement of articles picked by an attendant from inventory storage shelves and deposited in delivery cartons mounted on a cart. A scanner mounted on the cart is used to read codes on either the location or item to be picked to validate that the correct item has been picked.

Before or after items have been picked, the physical dimensions of the items can be used to determine the desired shipping carton size for the items to minimize "dead space" in the carton once the items have been packed.

One issue in the industry is the problem of storage facility space since a large inventory of flat boxes occupies a large amount of storage facility space. Two attempts to reduce the number of pre-made cartons, while also providing a sufficient variety of carton sizes to reduce the "dead space" in each carton are shown in U.S. Pat. Nos. 7,647,752 and 9,914,278. These patents disclose computer implemented methods and apparatus for calculating a customized carton size and transmitting the customized carton size to an "on-demand" carton-making machine to produce the custom sized carton. The problem with these methods is that they either require a large and expensive "carton-making machine" at each packing location or require the packer to constantly travel to and from a centrally located carton-making machine. An illustration of the scope of such a machine is shown in United States Patent Publication 2016/0176562. Such on-demand methods and systems have practical disadvantages in an operational order fulfilment facility.

It would be advantageous to have a system and method for selecting a shipping carton based upon the dimensions of the items to be packed into the carton without needing customized box making machines at each packing station, or without needing a centrally located carton-making machine, or without needing a large inventory of pre-made cartons.

Accordingly, it is an object of the present invention to provide for shipping carton selection from a large number of cartons without necessarily carrying a large inventory of pre-made shipping cartons.

It is an object of the present invention to provide a method for determining a set of desired shipping carton sizes, a manageable inventory of shipping cartons at the packing station, and a replenishable inventory of shipping cartons as they are used.

It is an object of the present invention to provide for computerized shipping carton identification and replenishment both at the packing station and for inventory replenishment at the packing station.

SUMMARY

Referring to the drawings, the system is explained further and is a light directed pack wall replenishment system comprising: an application server configured to identify a desired shipping carton size according to a set of item dimension information associated with items in a whole or partial order either to be placed directly into the desired shipping carton while being retrieved or items that have been placed into an item container to be packed and a set of carton specifications, including dimensional information; a packing wall controller configured to receive order item or item container information representing the item contents of an order or item container, transmit the order or item container information to the application server, receive a desired shipping carton identification from the application server, determine a location of a shipping carton on a pack wall according to the desired shipping carton identification, and actuate a first pack wall indicator assembly that is in communications with the pack wall controller to indicate the shipping carton to be used for containing the order items during retrieval or transferring items from the item container to the shipping carton; a delivery cart having a delivery cart controller in communications with the application server configured to receive replenishment information representing shipping cartons consumed and to be retrieved from a shipping carton supply area and delivered to the pack wall, direct the delivery cart to the carton supply area, actuate a delivery cart indicator assembly in communication with the delivery cart controller configured to identify a cart partition in which to place a replenishment shipping carton on the delivery cart, direct the delivery cart to the pack wall to be replenished, actuate the delivery cart indicator assembly to identify a replenishment shipping carton to be placed on the pack wall; and, wherein the pack wall controller is configured, based upon the identification action of a carton in the set of replenishment shipping cartons on the delivery cart, to actuate a second pack wall indicator assembly that is in communications with the pack wall controller to indicate the location on the pack wall to place the replenishment shipping carton retrieved from the delivery cart. Identification of the carton can be through scanning, bar code scanning, IR, or other means.

The system can include a delivery cart scanner for scanning replenishment shipping cartons when retrieving replenishment shipping cartons from a shipping carton supply area and placing these shipping cartons on the delivery cart. The system can include an identification system and method such as a packing area scanner to identify replenishment shipping cartons when retrieving replenishment shipping cartons from a delivery cart and placing these shipping cartons on the pack wall. The first pack wall indicator assembly can include a plurality of pack wall indicator assemblies, the second pack wall indicator assembly can include a plurality of pack wall indicator assemblies, and the delivery cart indicator assembly can include a plurality of cart indicator assemblies. The cart and supply area indicator assemblies can be a visual indicator bar, light assembly, light bar, LED light, alphanumeric display or any combination thereof. The cart and supply area indicator assemblies can include a raceway to carry light bars or light assemblies and can include an input device. The cart and supply area indicator assemblies can be in communications with the delivery cart controller, server, pack wall controller or any combination thereof.

The packing server can be configured to identify a desired shipping carton according to the set of item dimension information associated with items to be placed directly into the desired shipping carton or items that have been placed into an item container and an inventory of shipping cartons on the pack wall. The packing server can be configured to reduce the number of shipping cartons in a shipping carton inventory when a replenishment shipping carton is removed from the shipping carton supply area. The packing server can be configured to reduce a number of shipping cartons in a pack wall inventory when a shipping carton is removed from the pack wall. The packing server can be configured to increase a number of shipping cartons in a pack wall inventory when a replenishment shipping carton is placed on the pack wall. A pack wall controller can be in communications with an application server; and a pack wall visual indicator assembly can be configured to indicate the replenishment shipping carton to be removed from the shipping carton supply area and placed on the delivery cart.

The system can include a shipping carton supply area configured to provide replenishment shipping cartons of varying dimensions; a delivery cart having a delivery cart controller configured to identify a replenishment shipping carton to be retrieved from the shipping carton supply area and delivered to the pack wall, actuate a cart indicator assembly in communication with the delivery cart controller configured to identify a cart partition where to place a replenishment shipping carton on the delivery cart, direct the delivery cart to a pack wall, actuate the cart indicator assembly to identify the replenishment shipping carton to be placed on the pack wall; and, a pack wall controller configured to determine a desired shipping carton, determine a location of the desired shipping carton on the pack wall, actuate a first pack wall indicator assembly that is in communications with the pack wall controller to indicate an actual shipping carton to be used for transferring items from a first container, such as a tote, to the actual shipping carton, and actuate a second pack wall indicator assembly configured to identify the location on the pack wall to place the replenishment shipping carton retrieved from the delivery cart.

The shipping carton supply area can include an inventory of replenishment shipping cartons having varying dimensions. The shipping carton supply area can include a carton-making machine for making replenishment shipping cartons of varying dimensions. The application server can be configured to order shipping cartons according to actual shipping cartons used, receive replenishment shipping cartons into the shipping carton supply area, and update a number of replenishment shipping cartons in an inventory.

A packing area controller can be configured to determine a desired shipping carton according to an order information or item container information, determine the location of the desired shipping carton on the pack wall, actuate the first pack wall indicator assembly that is in communications with the packing area controller to indicate an actual shipping carton to be used for packing the order items into the desired shipping carton or transferring items from the item container to the desired shipping carton.

The system can include a first packing station and a second packing station in proximity to a pack wall; a first packing area controller associated with a first packing area configured to determine a first shipping carton to be used to pack items from a first order or first item container, determine a location of the first shipping carton on the pack wall, actuate a first pack wall indicator assembly to indicate the location on the pack wall of the first shipping carton; a second pack area controller associated with a second packing area configured to determine a second shipping carton to be used to pack items from a second order or second item container, determine the location of the second shipping carton on the pack wall, actuate the first pack wall indicator assembly to indication the location on the pack wall of the second shipping carton; and a delivery cart, having a delivery cart controller, configured to identify a replenishment shipping carton disposed on the delivery cart, actuate a cart indicator assembly to identify the replenishment shipping carton to be placed on the pack wall.

The system can include a first packing station; a packing area controller having a first scanner associated with the first packing station and a second scanner associated with the second packing station, The first scanner can be used to identify a first order or first item container so that a first shipping carton can be identified on the pack wall and the second scanner can be used to identify a second order or second item container so that a second shipping carton can be identified on the pack wall. The location of the first shipping carton on the pack wall can be identified by actuating a first pack wall indicator assembly to indicate the location on the pack wall of the first shipping carton and location of the second shipping carton on the pack wall can be identified by actuating a second pack wall indicator assembly to indicate the location on the pack wall of the second shipping carton.

The computer readable instructions that can be disposed on the cart controller, pick wall controller or server and can be configured to determine the sizes of cartons in a best set of "N" cartons to have been used for packing and shipping the orders in historical order data in order to minimize unused space in the cartons.

The system can include a delivery cart having a delivery cart controller configured to receive replenishment information representing replenishment shipping cartons to be retrieved from a shipping carton supply area and delivered to a pack wall, direct the delivery cart to the shipping carton supply area, provide for retrieving a shipping carton from the shipping carton supply area, actuate a cart indicator assembly to identify a cart partition where to place the retrieved shipping carton on the delivery cart, direct the delivery cart to the pack wall to be replenished, actuate the delivery cart indicator assembly to identify the replenishment shipping cartons to be placed on the pack wall; and, a pack wall controller in communication with the delivery cart controller and configured to receive order or item container information representing contents of an order or item container, receive a desired shipping carton identification information, determine a location of the desired shipping carton on a pack wall, actuate a first pack wall indicator assembly to indicate the shipping carton to be used for packing the contents of an order or item container and transmit shipping carton replenishment information representing that a shipping carton was retrieved from the pack wall and needs to be replenished, actuate a second pack wall indicator assembly to indicate the location on the pack wall where to place the replenishment shipping carton retrieved from the delivery cart.

The system can include a delivery cart scanner for scanning the replenishment shipping carton when retrieving the replenishment shipping carton from a shipping carton supply. A packing server can be in communications with the pack wall controller and configured to identify a desired shipping carton according to the set of item dimension information associated with items in an order or item container and an inventory of shipping cartons on the pack wall. The delivery cart controller can be configured to direct the delivery cart to a plurality of pack walls. The delivery cart controller can be configured to reduce a number of shipping cartons in a shipping carton inventory when a replenishment shipping carton is removed from the shipping carton supply area.

The pack wall controller can be configured to reduce a number of shipping cartons in a pack wall inventory when a shipping carton is removed from the pack wall. A shipping supply area controller can be in communications with a shipping carton inventory configured to increase a number of shipping cartons in the shipping carton inventory when a shipping carton is placed in the shipping carton supply area.

An actuator can be included in the cart indicator assembly. An alphanumeric display can be included in the cart indicator assembly.

The pack wall replenishment system can include a shipping carton supply area for storing shipping cartons wherein each shipping carton location can include a shipping carton indicator; and, a delivery cart having a delivery cart controller configured to identify a replenishment shipping carton using the shipping carton location indicator, provide retrieval instructions to a replenishment worker to retrieve the shipping carton from the shipping carton location, actuate a cart indicator assembly in communication with the delivery cart controller configured to identify a cart partition where to place the replenishment shipping carton on the delivery cart, direct the delivery cart to a pack wall, actuate the cart indicator assembly to identify the cart partition containing the set of shipping cartons on the delivery cart to be placed on the pack wall, actuate a pack wall indicator assembly in communications with the delivery cart controller to indicate the location on the pack wall to place the replenishment shipping carton retrieved from the delivery cart. In another embodiment, a scanner can be used to scan a shipping carton supply area identifier, such as a barcode, in place of the shipping carton location indicator to confirm that the correct carton size is being retrieved from the shipping carton supply area location.

The system can include a first packing station and a second packing station in proximity to a pack wall; a pack wall controller associated with the pack wall configured to determine a first shipping carton to be used to receive items disposed at the first pack station, determine a second shipping carton to be used to receive items disposed at the second pack station, aggregate the number of first shipping cartons used at the first packing states and the second shipping cartons used at the second packing station, provide to a delivery cart controller the number and size of first shipping cartons and second shipping cartons used; and, a delivery cart carrying the delivery cart controller configured to receive the number and size of first shipping cartons used and second shipping cartons used, direct the delivery cart to a shipping carton supply area, direct retrieval of replenishment shipping cartons, direct delivery of the replenishment shipping cartons to the pack wall and actuate a pack wall indicator assembly to indicate removal of the replenishment shipping carton from the delivery cart and indicate placement on the pack wall of the replenishment shipping carton.

The pack wall controller can be configured to actuate the first pack wall indicator assembly with a first color to indicate a first shipping carton to be retrieved from the pack wall for the first packing station and actuate the pack wall indicator assembly with a second color to indicate a second shipping carton to be retrieved from the pack wall for the second packing station. A front pack wall indicator assembly can be configured to indicate a shipping carton to remove from the pack wall to receive items at the first packing station. A rear pack well indicator assembly can be configured to indicate a location on the pack wall where to place a replenishment shipping carton. The delivery cart controller can be configured to direct the delivery cart to the shipping carton supply area when no more shipping cartons remain on the delivery cart. The delivery cart controller can be configured to receive a number and type of first shipping cartons and second shipping cartons used and direct retrieval of the number and of first shipping cartons and second shipping cartons from the shipping carton supply area to be placed on the delivery cart. The types of shipping cartons can include different sizes, different shapes, different construction materials, different geometric configuration or any combination.

The delivery cart can provide shipping containers to multiple pack walls in a single run using each partition on the delivery cart to segregate the shipping cartons designated for each pack wall

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION

Figure 1:
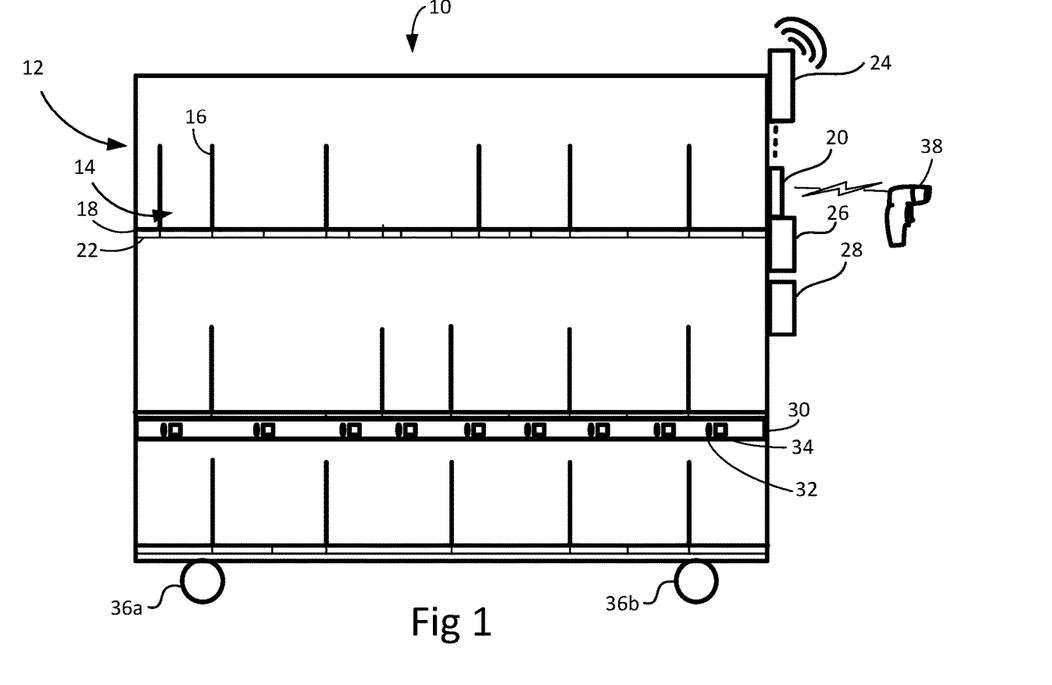
FIG. 1 is a front view of a delivery cart.

With reference to the drawings, the invention will now be described in more detail. Referring to FIG. 1, a front side of a delivery cart 10 can include a delivery cart storage area 12 for receiving, storing, and delivering shipping cartons to a pack wall. The shipping carton can be in an assembled or dissembled configuration. Each delivery cart storage area 12 can include a delivery cart partition 14 defined by one or more delivery cart dividers 16 and on a delivery cart shelf 18. The delivery cart divider can be movable along the shelf so that each delivery cart partition can be equal to or unequal in width of an adjacent delivery cart partition. The vertical distance between delivery cart shelves can be the same for each delivery cart shelf or different for each delivery cart shelf allowing for the accommodation of shipping cartons of different sizes. A delivery cart partition can contain shipping cartons of the same type. The delivery cart partition can contain shipping cartons of different types and can be associated with a specific pack wall.

A delivery cart controller 20 can be affixed to the delivery cart or removably attached to the delivery cart and can remain in wired or wireless electronic communications with various delivery cart components including a cart indicator assembly such as a light bar 22 that can be disposed beneath one or more cart partitions. Each cart shelf can have a unique cart indicator assembly. The cart indicator assembly can include a set of LED lights wherein the set of LED lights can include a subset of LED lights associated with each partition area. The LED lights can include different colors that can be actuated independently from each other. The delivery cart controller can include a transceiver integrated into the delivery cart controller or a transceiver 24 that is in electronic communications with the delivery cart controller. The delivery cart controller can be in communication with a plurality of cart indicator assemblies. The delivery cart controller can also be in communication with an LED controller 26 to send instructions to the LED controller to actuate one or more LED lights on the cart indicator assembly.

The delivery cart can include a cart indicator assembly controller 28 that can be in communication with one or more cart indicator assemblies. The cart indicator assembly can be disposed under one or more shelves. The cart indicator assembly can be a light assembly 30 that can include one or more actuators 32 and/or one or more alpha numeric displays 34. The actuator can be a proximity sensor, button, or other input device to allow the worker to input information into the light assembly. The use of a proximity switch for the light assembly input can simplify the input process and advantageously present no movable parts for wear or breakage and enable the light assembly to operate in a sealed, transparent enclosure that can be configured to withstand corrosive treatment in harsh environments. The cart partition can be associated with a cart indicator assembly. In one embodiment, the cart indicator assembly can indicate the quantity and location of a shipping carton to be placed on the delivery cart partition or removed from the delivery cart. The light assembly controller can receive information from the delivery cart controller, pack wall controller, shipping carton supply area controller, other controller or any combination thereof.

The cart indicator assembly can be disposed along a raceway allowing for variations in positioning of the actuators and alpha numeric displays. This functionality allows the actuators and alpha numeric displays to be associated with cart partitions regardless of the size or width of the partition areas.

The delivery cart controller can be wired or in wireless communications with a delivery cart scanner such as a bar code scanner 38. The delivery cart can include casters 36a and 36b allowing the delivery cart to be mobile about the facility floor.

Figure 2:
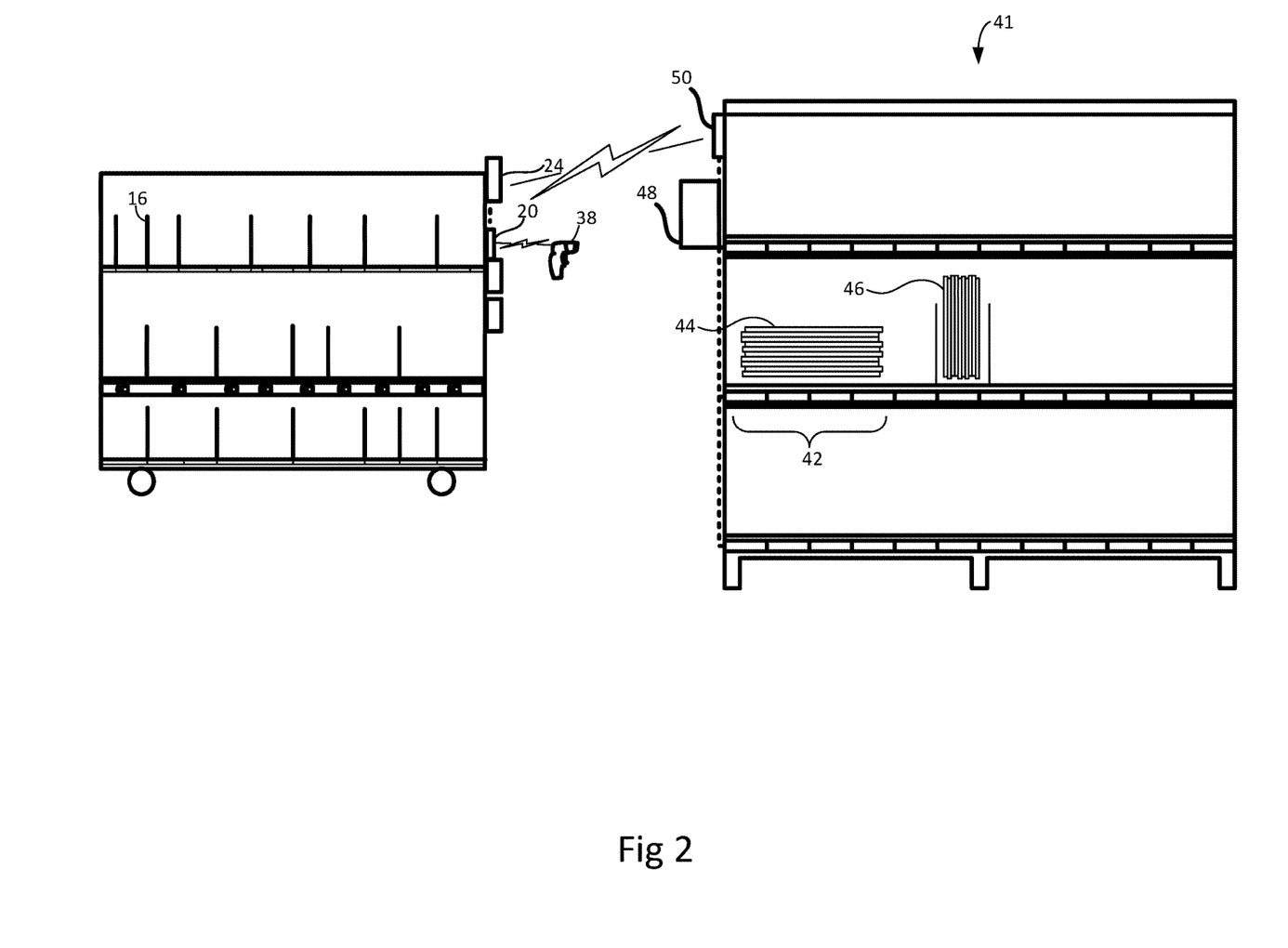
FIG. 2 is a front view of aspects of the system.

Referring to FIG. 2, shipping cartons can be in a shipping carton supply area 41 where inventory of shipping cartons can be stored. The shipping carton supply area can be a location where shipping cartons 44 and 46 are created, received from third parties, stored or a combination thereof. The shipping carton inventory can be stored at a distance from the packing station to reduce the inventory of shipping cartons needed at the packing station to better utilize the packing station area for shipping cartons, item containers, carton sealing machines, and the like. The shipping cartons can be stored on shelves, bins, pallets, floor or any combination thereof.

The various controllers can provide audio or visual information to a replenishment worker to inform the replenishment worker to retrieve specific shipping cartons and specific quantities of shipping cartons from the shipping carton supply area. The controllers can also be automated robotic systems configured to perform the tasks described herein. Once at the shipping carton supply area, the replenishment worker can identify the shipping carton needed, such as with item number, barcode, or other designation. The shipping carton supply area can include supply area indicator assemblies 42 to assist the replenishment worker in identifying the shipping carton 44 and quantity to retrieve. The shipping carton 44 can be stored horizontally and shipping cartons 46 can be stored vertically and can be in the disassembled configuration. The shipping carton supply area can have shipping cartons grouped together by size or other attribute of the shipping carton.

In one embodiment, the replenishment worker can scan a shipping carton indicator such as a bar code, QR code or other indicator on the shipping carton to both verify that the replenishment worker is selecting the correct shipping carton and to inform the delivery cart controller that the shipping carton has been placed on the delivery cart The bar code scanner can be in communications with the delivery cart controller, supply area controller, server or any combination thereof. The replenishment worker can operate an actuator associated with the indicator assembly adjacent to the cartons in the shipping carton supply area, to report or confirm that the correct shipping cartons have been retrieved. A scanner may alternatively be used to confirm that the correct shipping cartons have been retrieved.

After confirming retrieval of shipping cartons, the delivery cart controller can actuate the cart indicator assembly associated with a cart partition area on the delivery cart informing the replenishment worker where to place the retrieved shipping cartons on the delivery cart. The delivery cart controller can visually and/or verbally inform the replenishment worker of the quantity to place on the delivery cart. If light assemblies are included on the delivery cart, the alpha numeric or numeric display can inform the replenishment worker of the partition on the delivery cart where to place the shipping carton and the quantity to retrieve and place. The replenishment worker can operate the delivery cart partition actuator informing the delivery cart controller that the shipping carton has been placed on the delivery cart. A scanner may be used to confirm that the shipping cartons have been placed into the correct delivery cart partitions. The delivery cart controller can transmit retrieval information to a server or supplier database so that the carton supplier can be informed of the shipping carton type and quantity removed from the shipping carton supply that are then placed on the deliver cart. The supplier, who may be remote from the facility, can then periodically replenish cartons in the carton supply area. The retrieved shipping cartons can be resupplied from an external source or an onsite source.

The delivery cart controller can then determine if more shipping cartons are to be placed on the delivery cart and display the information about the next shipping carton size and supply area location of the shipping carton size required to the replenishment worker.

The storage area can be associated with a supply area controller 48 that can have a transceiver 50. The shipping carton supply area transceiver can communicate with the delivery cart transceiver 24 to communicate information to the delivery cart such as when the delivery cart is near a location containing a shipping carton to be retrieved. The shipping carton supply area controller can be in communications with the application server, database server, server or any combination.

When the replenishment order is completed, and the shipping cartons are all placed on delivery cart, the replenishment worker can then be directed to the pack wall by visual or audio instructions from the delivery cart controller.

Figure 3:
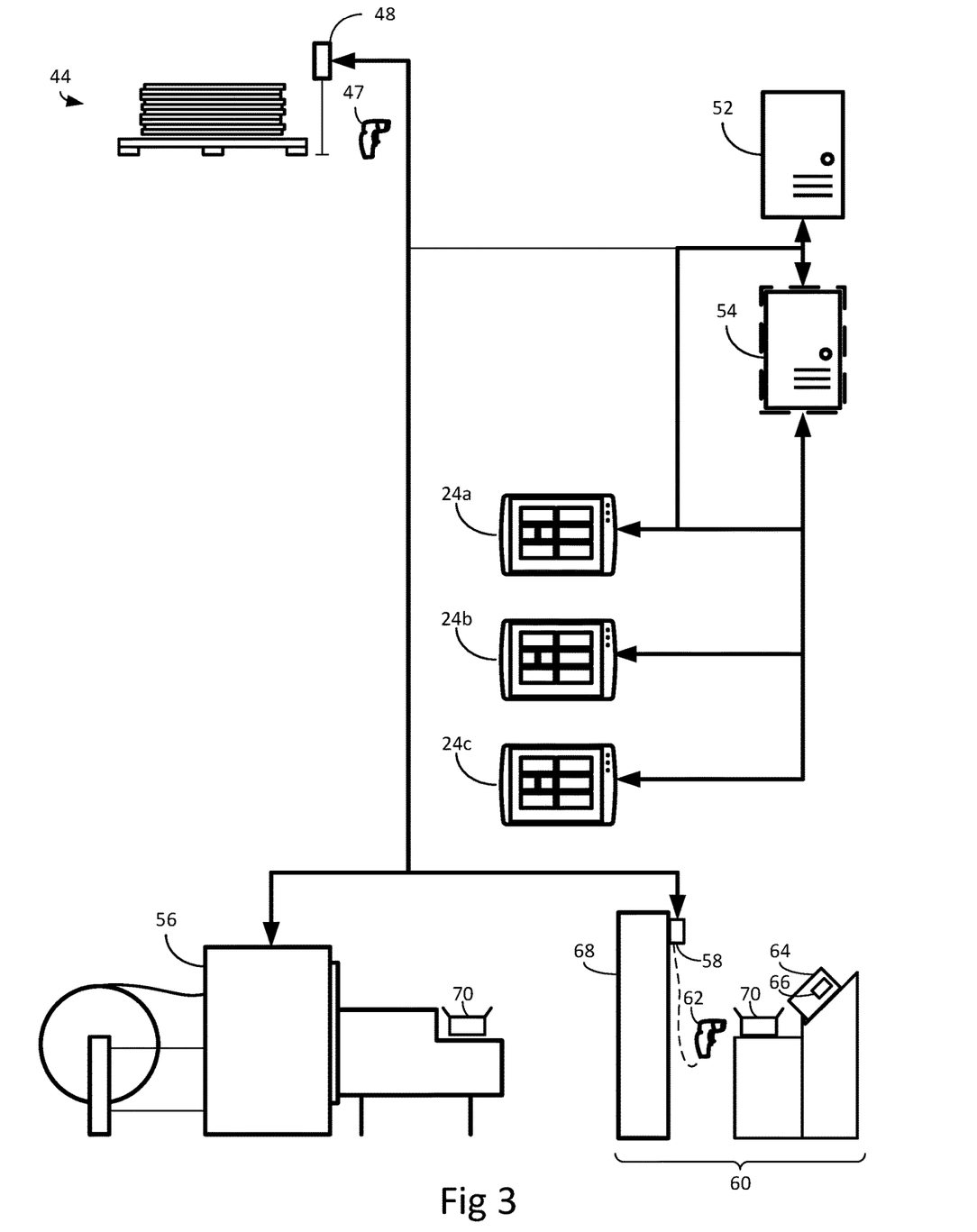
FIG. 3 is a schematic of aspects of the system.

Referring to FIG. 3, a database server 52 can be in communications with an application server 54. The database server and application server can be a physically separate servers, the same physical server or can be a set of computer readable instructions or in another computer. The application server can be in communications with a delivery cart controller 24*a*, either directly or indirectly through a shared database server, to transmit resupply information to the delivery cart controller. The delivery cart can then inform a replenishment worker that specific shipping cartons need to be delivered to a specific pack wall. The replenishment worker can be informed to remove one or more shipping cartons from a specific delivery cart partition and place the shipping cartons on the pack wall. The delivery cart partition can include shipping cartons of the same type or difference types. Multiple delivery carts having delivery cart controllers 24*a*, 24*b* and 24*c* can be used simultaneously.

In one configuration a scanner can be in communications with the delivery cart controller. The delivery cart controller can then communicate with a shipping carton supply area controller configured to illuminate a light assembly.

In one configuration the delivery cart scanner can scan a shipping carton identifier on a shipping carton and then the delivery cart controller can activate a delivery cart light assembly to identify the location on the delivery cart where the shipping carton is to be placed.

The shipping carton supply area can include a supply area scanner 47 in communications with shipping carton supply area controller 48. When a shipping carton is removed from the shipping carton supply area, the shipping carton can be scanned, and the inventory of available shipping containers can be updated.

When new shipping cartons 44 are delivered to facility, the shipping cartons can be placed in the shipping carton supply area or other appropriate area and scanned with scanner 47. The inventory of shipping cartons in the shipping carton supply area can be updated to show that shipping cartons have been added to the inventory. When a shipping carton making machine is used to make shipping cartons, the inventory of shipping cartons at the shipping carton supply area can be updated to include the additional shipping cartons.

At a packing station 60, an item container 64 can be disposed in the packing station and contain items to be placed in a shipping carton to be shipped. The packer can scan an item container identifier 66 on the item container with scanner 62. The item container identifier can be used to determine the items in item container and to determine the desired sized shipping container. The pack wall controller 58 can then retrieve the item information from the database server. Using the items in the item container and item information, computer readable instructions can determine the desired shipping carton to select from a pack wall 68. The desired shipping carton can be selected according to the dimensions of the items in the item container, the number and sizes of available shipping cartons on the pack wall, the possible arrangements of the items in the shipping cartons, the number and sizes of shipping cartons in the shipping carton supply area, or a combination thereof.

The shipping carton on the pack wall can be indicated using the pack wall indicator assembly included with the pack wall. The packer can then remove the indicated shipping carton from the pack wall, erect the shipping carton, move the items from the item container 64 to the shipping carton 70, and can send the filled shipping carton to a dunnage, taping, labeling, or other processing area.

Figure 4A:
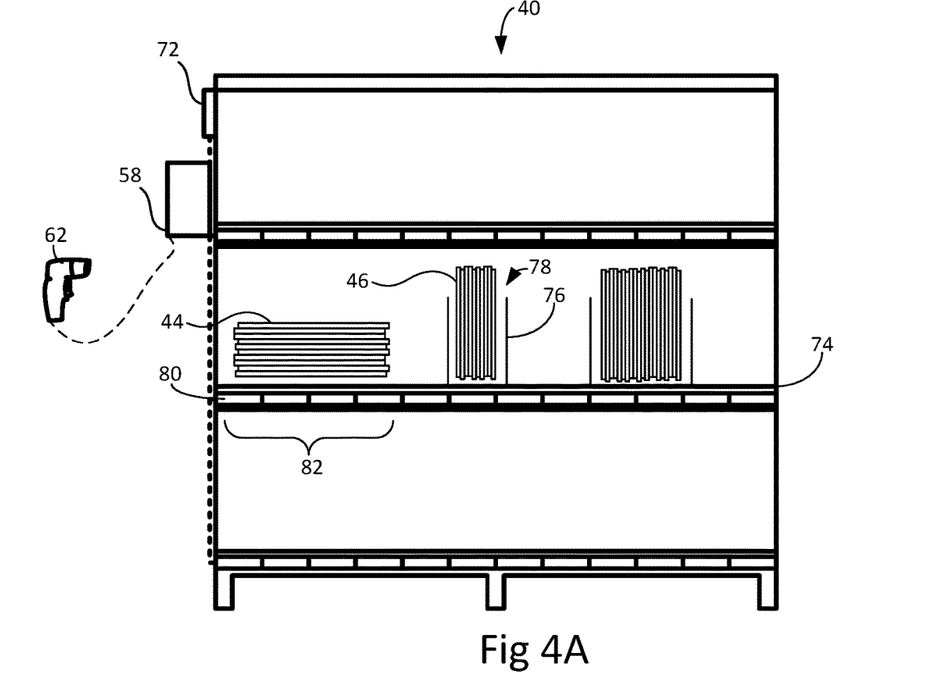
FIG. 4A is front view of aspects of a pack wall.

Referring to FIG. 4A, the front side of a pack wall 40 is shown. The pack wall can carry a pack wall controller that can include an internal transceiver or external transceiver 72.

The pack wall can include shipping cartons 44 and 46 on a pack wall shelf 74. Pack wall dividers 76 can define pack wall partitions 78 for holding shipping cartons. Each pack wall partition can be allocated a shipping carton of a specific size. The pack wall partitions can be associated with a pack wall indicator assembly 80. Multiple pack wall indicator assemblies can be associated with a pack wall partition 82 so that when pack wall indicator assemblies are actuated, the packer knows to retrieve one or more shipping cartons from that partition.

Figure 4B:
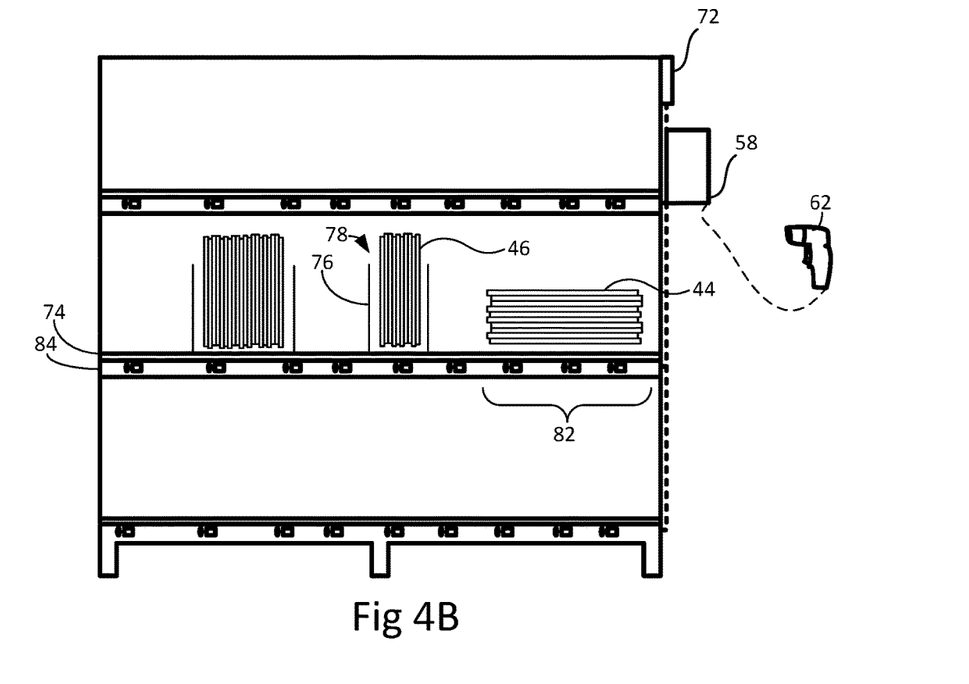
FIG. 4B is rear view of aspects of a pack wall.

Referring to FIG. 4B, the rear of the pack wall is shown. Disposed on the rear side of the pack wall can be pack wall indicator assembly 84. When a delivery cart is in proximity to a pack wall needing shipping carton replenishment, the pack wall controller can communicate with the delivery cart controller. In one embodiment, the replenishment worker can retrieve shipping cartons from the delivery cart and scan the shipping cartons. The scanner can communicate with the pack wall controller and actuate the light bar where the shipping carton is to be placed on the pack wall. The replenishment worker then places the shipping carton in the pack wall partition in the indicated location. The database server can then be updated to reflect this action. The scan of the next carton on the cart partition associated with the pack wall will extinguish the light bar adjacent to the pack wall partition and actuate pack wall indicator assembly adjacent to another pack wall partition into which this next shipping carton should be placed.

Figure 5:
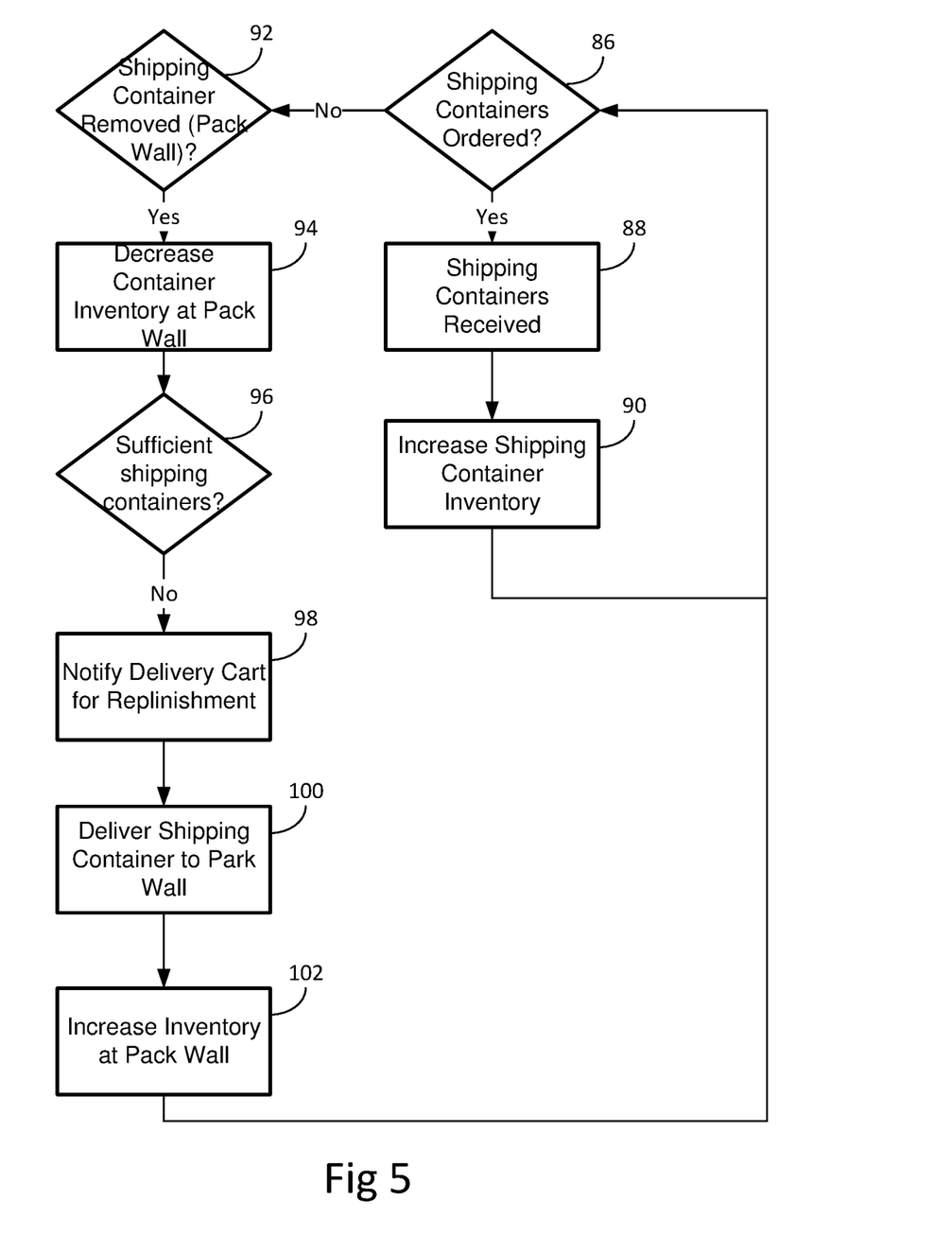
FIG. 5 is a schematic of aspects of the computer readable instructions; and,
FIG. 6 is a top down view of various components of the system.

Referring to FIG. 5, the operation of the various components and computer readable instructions are shown. At 86, a determination is made whether shipping cartons need to be ordered. If ordered and received, the shipping cartons are received into the shipping carton supply area in response to the facility ordering or requesting shipping contains at 86 when they arrive at the facility. The shipping cartons can originate from an external third-party source or from an internal source such as existing inventory or a carton-making machine. The inventory of shipping cartons is updated at 90. At 92, a determination is made if a shipping carton has been removed from a pack wall. If so, the inventory of the shipping cartons at the pack wall is updated at 94. At 96, a determination is made if there are enough shipping cartons located at the pack wall. If not, a delivery cart is notified to replenish the pack wall at 98. A replenishment worker takes the delivery cart to the shipping carton supply area, retrieves the shipping carton, places it on the delivery cart, and delivers the shipping carton to the pack wall at 100. The inventory of the pack wall is increased, and the inventory of shipping cartons is decreased at the shipping carton supply area at 102.

The computer readable instructions of the pack wall controller can include instructions to transmit information representing that a shipping carton can been taken from the pack wall. The computer readable instructions of the cart controller can include instructions to transmit information representing that a shipping carton can been taken from the delivery cart. The computer readable instructions of the server or cart controller can include instructions to aggregate the needed shipping carton at one or more pack walls and instruct the replenishment worker to place the appropriate shipping cartons on the delivery cart and delivery the appropriate shipping cartons to the pack wall. The computer readable instructions of the cart controller can include instructions that all shipping cartons have been delivered to the respective pack walls. The shipping cartons to be delivered to one or more pack walls can then be aggregated and instructions provided to the replenishment worker to retrieve shipping cartons to be delivered to pack walls. This aspect removes the need for minimum or maximum shipping carton calculations and allows each delivery cart to gather shipping carton requirements for pack walls almost immediately upon completion of the delivery of shipping carton to the pack walls by the delivery cart.

Figure 6:
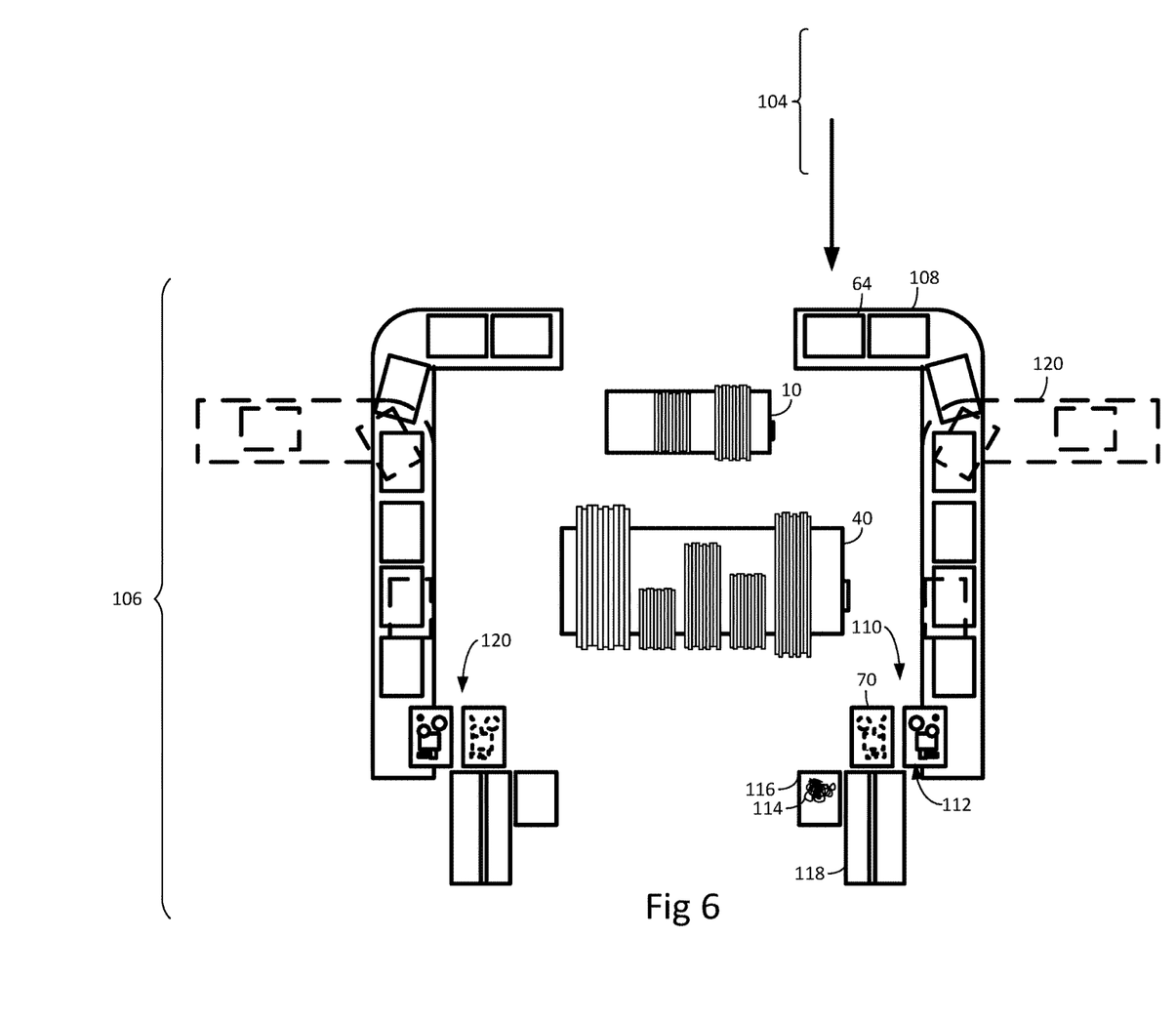

Referring to FIG. 6, the process includes items being picked from storage locations in a storage area 104 and placed in an item container 64. The item container can be placed in packing area 106. The item container can make its way down a first conveyer 108 to a transfer area 110 where items 112 are transferred from the item container to a shipping carton 70. When the packer scans the item container, the packer retrieves the carton from the front side of pack wall 40, as directed by a pack wall indicator assembly on the front side, erects the carton, and places the carton in the transfer area. When the items from the item container have been packed into the selected shipping carton, packing dunnage material 114 can be retrieved from location 116 and placed in the shipping carton to cushion and protect the contents from shipping damage. The shipping carton can be placed in a taping machine 118 to be sealed. The shipping carton can be placed on a second conveyer 120 and transferred to the labeling and shipping area. As needed, the delivery cart 10 can replenish the rear side of pack wall 40 with shipping cartons. There can be two or more packing stations shown as 110 and 122 that can share one pack wall to reduce the floor space taken by shipping cartons in the packing stations.

In some cases, items from a storage facility, such as a warehouse, can be picked into a tote or other container. This action can be advantageous when there is some post-picking activity such as applying appliqués, or arranging picked items nicely to provide for improved presentation when the carton is opened. In some cases, items from a storage facility can be picked directly into the shipping carton.

The system can be used to place or replenish a shipping carton on a mobile unit. A mobile unit can include a structural frame. The mobile unit may be any of a variety of custom or commercially available carts appropriate to move within a specific facility. Most commonly, the mobile unit is moved by hand; however, the use of motorized mobile units or trays carried on conveyors can also be present. Receptacles can be positioned on shelves of the mobile unit. The receptacles can be shipping cartons, totes, or other containers to receive picked items. Various means may be used to secure the receptacles on the shelves. An intelligent light assembly on a mobile unit can be positioned on or convenient to each receptacle, and each mobile unit light assembly can be in electronic communications to a mobile unit controller. Each mobile unit light assembly can include a visual display such as an LED or character display and an actuator such as a momentary contact switch or similar device. The actuator can be used to set initial light addresses and to provide the means by which the worker indicates that the designated put has been completed.

The mobile unit can include an upright cart with a base containing casters and can include a vertical frame with a top support. A power unit can be carried by the mobile unit and include removable power packs. The mobile unit controller can be removably positioned on the structural frame and can be configured to translate pick order location data to specific intelligent light assembly addresses. The mobile unit can include a visual display audio communications keypad, or touch screen capable of data entry. The mobile unit controller can receive pick order and other data and instructions by wireless means, by speech input, by computer medium transfer, by network communications, by keypad entry, or comparable means. The portable computer also preferably has audio communication capabilities by means of an integrated microphone and speaker system.

The mobile unit controller can be configured to direct the worker to a pack wall, retrieve an indicated shipping carton from the pack wall and indicate the location on the mobile unit where to place the shipping carton. The mobile unit can then used to pick items from a storage facility directly into the shipping carton. The shipping carton selected for retrieval from the pack wall and placement on the mobile unit can be selected according the item order information. When filled, the shipping carton can be disposed at packing location for preparation for shipping.

Further details of the mobile unit are found in U.S. Pat. Nos. 6,775,588 and 8,019,463 and United States Patent Application Publication 2018/0286002 all of which are by the same inventor of the present system and all of which are incorporated by reference.

The transceiver of the delivery cart can have a limited transmission range so that the shipping carton supply area or pack wall cannot detect the delivery cart until the delivery cart is in desired proximity to the shipping carton supply area or pack wall. This limited range transmission detection enables a shipping supply area controller to signal the delivery cart that it is in desired proximity, so the delivery cart controller can in turn verbally or visually direct the cart attendant to "STOP."

The communications between the database server, application server, delivery cart, and pack wall controller can utilize one or more of several available formats/methods including flat file (CSV or XML), database stored procedures, shared database tables, packets, IP messaging, or any combination. Information used for replenishment and selection of shipping cartons can be transmitted from the application server to or from the delivery carts, or pack walls through the database server.

A reporting system can be used to allow for quickly identifying actual and potential problems and opportunities for improving efficiency of the replenishment operations. Based on date/time range and other filters, the servers can report various measures of operational performance by replenishment worker, packer, time period, packing area, etc. Measures can include statistics such as number of replenishments, replenishment hours, number of pack walls replenished, the type of cartons used, quantity used, average time per replenishment or shipping carton use, average shipping carton replenished per hour, and average shipping carton filled per unit time.

The invention uses a distributed architecture model with multiple delivery carts, wherein each cart can have a set of computer readable instructions and a local database. Once replenishment instructions have been received by the delivery cart controller, replenishment can commence with no further communications between the delivery cart and the servers. In one embodiment, the results of replenishment can be communicated in real-time from the delivery cart to the database server that in turn can communicate this information to the application server or facility database server. If, however, communications connectivity is unavailable or is interrupted (e.g. due to a communication dead spot or other cause in the facility) this distributed architecture design enables operation in a fault tolerant mode so that replenishment can continue using data stored in the delivery cart local database. When communications are restored, the delivery cart local database can be synchronized with the various server databases.

Aspects of this invention improve the functioning of the computer used for this invention and can analyze real world events. Computer readable instructions, when executed by a computer processor, cause the computer to perform a series of steps to accomplish a specific task and result in useful, concrete, and tangible results adding substantially more to the operation of a general computer. The computer instructions improve the functioning of the computer itself to provide a novel improvement of the function of the computer and technology as described herein. These computer readable instructions are tied to a particular machine or apparatus with the specific purpose of executing the computer readable code for accomplishing tangible results and accomplishing the manipulation of physical data.

The details herein may be presented in terms of program procedures executed on a computer or network of computers. These procedural descriptions are representations used by those skilled in the art to most effectively convey the substance of their work to others skilled in the art. These procedures herein described are generally a self-consistent sequence of steps leading to a desired result, when executed by a computer and its processor representing or resulting in the tangible manipulation of physical objects. These steps also require physical manipulations of physical quantities such as electrical or magnetic physical elements and are capable of being stored, transferred, combined, compared, or otherwise manipulated readable medium that is designed to perform a specific task or tasks. Actual computer or executable code or computer readable code or instructions may not be contained within one file or one storage medium but may span several computers or storage mediums. The term "host" and "server" may be hardware, software, or combination of hardware and software that provides the functionality described herein.

The present invention is described below with reference to flowchart illustrations of methods, apparatus ("systems") and computer program products according to the invention. It will be understood that each block of a flowchart illustration can be implemented by one or more sets of computer readable instructions or code. These flowcharts, with the written description, illustrate the improvement in the technology and technical field of this invention.

Elements of the flowchart support combinations of means for performing the special functions, combination of steps for performing the specified functions, and program instruction means for performing the specified functions. It will be understood that each block of the flowchart illustrations can be implemented by special purpose hardware-based computer systems that perform the specified functions, or steps, or combinations of special purpose hardware or computer instructions.

The present invention has been described with reference to the drawings in which the preferred embodiment of the invention is shown. This invention may, however, be embodied in many different forms and should not be construed as limited to the embodiments set forth herein. Rather, these embodiments are provided so that this disclosure will be thorough and complete and will fully convey the scope of the invention to those skilled in the art.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. While the invention is described herein with reference to several specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiment described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A pack wall carton selection and replenishment system comprising:
   a delivery cart having a delivery cart controller configured to receive shipping carton replenishment information representing a replenishment shipping carton to be retrieved from a shipping carton supply area and delivered to a pack wall, direct the delivery cart to the shipping carton supply area, provide for retrieving one or more shipping cartons from the shipping carton supply area, actuate a cart indicator assembly to identify a cart partition where to place the retrieved shipping cartons on the delivery cart, direct the delivery cart to the pack wall to be replenished, actuate a delivery cart indicator assembly to identify the replenishment shipping carton to be placed on the pack wall;
   a pack wall controller in communication with the delivery cart controller configured to receive an order item information, actuate a first pack wall indicator assembly to indicate a desired shipping carton to be used for packing an items represented by the order item information, transmit shipping carton replenishment information representing that the shipping carton was retrieved from the pack wall and needs to be replenished and actuate a second pack wall indicator assembly to indicate the location on the pack wall where to place the replenishment shipping carton retrieved from the delivery cart; and,
   a packing server in communications with the pack wall controller and configured to identify a desired shipping carton according to a set of item dimension information associated with items in an order and an inventory of shipping cartons on the pack wall.

2. The system of claim 1 including a delivery cart scanner for scanning the replenishment shipping carton when retrieving the replenishment shipping carton from the shipping carton supply area and placing replenishment shipping cartons in a delivery cart partition.

3. The system of claim 1 wherein the delivery cart controller is configured to direct the delivery cart to a plurality of pack walls.

4. The system of claim 1 wherein the delivery cart controller is configured to reduce a number of shipping cartons in a shipping carton inventory when the replenishment shipping carton is removed from the shipping carton supply area.

5. The system of claim 1 wherein the pack wall controller is configured to reduce a number of shipping cartons in a pack wall inventory when the shipping carton is removed from the pack wall.

6. The system of claim 1 including a shipping supply area controller in communications with a shipping carton inventory configured to increase a number of shipping cartons in the shipping carton inventory when the shipping carton is placed in the shipping carton supply area.

7. A pack wall carton selection and replenishment system comprising:
   a delivery cart having a delivery cart controller configured to receive shipping carton replenishment information representing a replenishment shipping carton to be retrieved from a shipping carton supply area and delivered to a pack wall, direct the delivery cart to the shipping carton supply area, provide for retrieving one or more shipping cartons from the shipping carton supply area, actuate a cart indicator assembly to identify a cart partition where to place the retrieved shipping cartons on the delivery cart, direct the delivery cart to the pack wall to be replenished, actuate a delivery cart indicator assembly to identify the replenishment shipping carton to be placed on the pack wall;
   a pack wall controller in communication with the delivery cart controller configured to receive an order item information, actuate a first pack wall indicator assembly to indicate a desired shipping carton to be used for packing an items represented by the order item information, transmit shipping carton replenishment information representing that the shipping carton was retrieved from the pack wall and needs to be replenished and actuate a second pack wall indicator assembly to indicate the location on the pack wall where to place the replenishment shipping carton retrieved from the delivery cart; and, wherein the delivery cart controller is configured to receive a set of initial shipping carton information representing the shipping cartons to be initially placed on the pack wall according to historical order fulfillment data.

8. The system of claim 7 including a shipping carton location indicator configured to identifying the location of the shipping carton in the shipping carton supply area.

9. The system of claim 7 wherein the pack wall controller is configured to actuate the pack wall indicator assembly according to a communication from the delivery cart controller.

10. The system of claim 7 including an actuator included in the cart indicator assembly configured to indicate that the shipping carton has been retrieved from the shipping carton supply area and placed on the delivery cart.

11. The system of claim 7 including an actuator included in the cart indicator assembly configured to indicate that the shipping carton has been retrieved from the delivery cart and placed on the pack wall.

12. The system of claim 7 wherein the shipping carton supply area includes a carton making machine for making replenishment shipping cartons.

13. The system of claim 7 including a mobile unit configured to actuate a pack wall indicator assembly to indicate a shipping carton to remove from the pack wall to be placed on the mobile unit.

14. The system of claim 13 including a mobile unit light assembly carried by the mobile unit configured to indicate the location on the mobile unit to place the shipping carton.

15. A pack wall carton selection and replenishment system comprising:
  a first packing station and a second packing station in proximity to a pack wall;
  a pack wall controller associated with the pack wall configured to determine a first shipping carton to be used to receive items disposed at the first packing station, determine a second shipping carton to be used to receive items disposed at the second packing station, aggregate the number of first shipping cartons used at the first packing station and the number of second shipping cartons used at the second packing station, provide to a delivery cart controller a number and size of first shipping cartons and second shipping cartons used; and,
  a delivery cart carrying the delivery cart controller configured to receive the number and type of first shipping cartons used and number and type of second shipping cartons used, direct the delivery cart to a shipping carton supply area, direct retrieval of replenishment shipping cartons, direct delivery of the replenishment shipping cartons to the pack wall, actuate a pack wall indicator assembly to direct removal of the replenishment shipping cartons from the delivery cart and direct placement of the replenishment shipping cartons on the pack wall.

16. The system of claim 15 wherein the delivery cart controller is configured to direct retrieval of a first replenishment shipping carton used and placement in a first delivery cart partition associated with a first pack wall, direct retrieval of second replenishment shipping cartons used and placement in a second delivery cart partition associated with a second pack wall, direct delivery of the first replenishment shipping cartons to the first pack wall, actuate a delivery cart indicator assembly indicating the delivery cart partition containing first replenishment shipping cartons to be removed, actuate a pack wall indicator assembly to indicate the desired placement location of first replenishment shipping cartons on the first pack wall, direct delivery of the second replenishment shipping cartons to the second pack wall, actuate a delivery cart indicator assembly indicating the partition containing second replenishment shipping cartons to be removed, and actuate a pack wall indicator assembly to indicate desired placement location of second replenishment shipping cartons on the second pack wall.

17. The system of claim 15 wherein the pack wall controller is configured to actuate a pack wall indicator assembly with a first color to indicate the first shipping carton to be retrieved from the pack wall for the first packing station and actuate the pack wall indicator assembly with a second color to indicate the second shipping carton to be retrieved from the pack wall for the second packing station.

18. The system of claim 17 wherein the second color is not displayed until the first shipping carton is retrieved from the pack wall.

19. The system, of claim 15 including;
  a front pack wall indicator assembly configured to indicate a shipping carton to retrieved from the pack wall where to receive items at the first packing station; and,
  a rear pack well indicator assembly configured to indicate a location on the pack wall where to place a replenishment shipping carton.

20. The system of claim 15 wherein the delivery cart controller is configured to receive the number and type of first shipping cartons and second shipping cartons used and direct retrieval of the number and type of first shipping cartons and second shipping cartons from the shipping carton supply area to be placed on the delivery cart.

* * * * *